No. 733,141. PATENTED JULY 7, 1903.
G. H. BURPEE.
MECHANICAL MOVEMENT.
APPLICATION FILED MAY 23, 1902.
NO MODEL. 2 SHEETS—SHEET 1.

Witnesses:—
Frank L. A. Graham
Herman E. Metius

Inventor:—
George H. Burpee,
by his Attorneys,
Hinom & Howson

No. 733,141. PATENTED JULY 7, 1903.
G. H. BURPEE.
MECHANICAL MOVEMENT.
APPLICATION FILED MAY 23, 1902.
NO MODEL. 2 SHEETS—SHEET 2.

Witnesses:—
Frank L. G. Graham
Herman E. Mehus

Inventor:—
George H. Burpee
by his Attorneys

No. 733,141. Patented July 7, 1903.

UNITED STATES PATENT OFFICE.

GEORGE H. BURPEE, OF PHILADELPHIA, PENNSYLVANIA, ASSIGNOR TO FUEL ECONOMIZER COMPANY OF AMERICA, OF CAMDEN, NEW JERSEY, A CORPORATION OF NEW JERSEY.

MECHANICAL MOVEMENT.

SPECIFICATION forming part of Letters Patent No. 733,141, dated July 7, 1903.

Application filed May 23, 1902. Serial No. 108,719. (No model.)

*To all whom it may concern:*

Be it known that I, GEORGE H. BURPEE, a citizen of the United States, residing in Philadelphia, Pennsylvania, have invented certain Improvements in Mechanical Movements, of which the following is a specification.

The object of my invention is to change a rotary motion into a reciprocating motion.

My invention relates particularly to mechanism for operating the scrapers of a fuel-economizer where it is desired to reciprocate the said scrapers up and down in contact with the circulating-tubes of the economizer. The motion is delivered from a wheel driven in one direction only.

Figure 1:
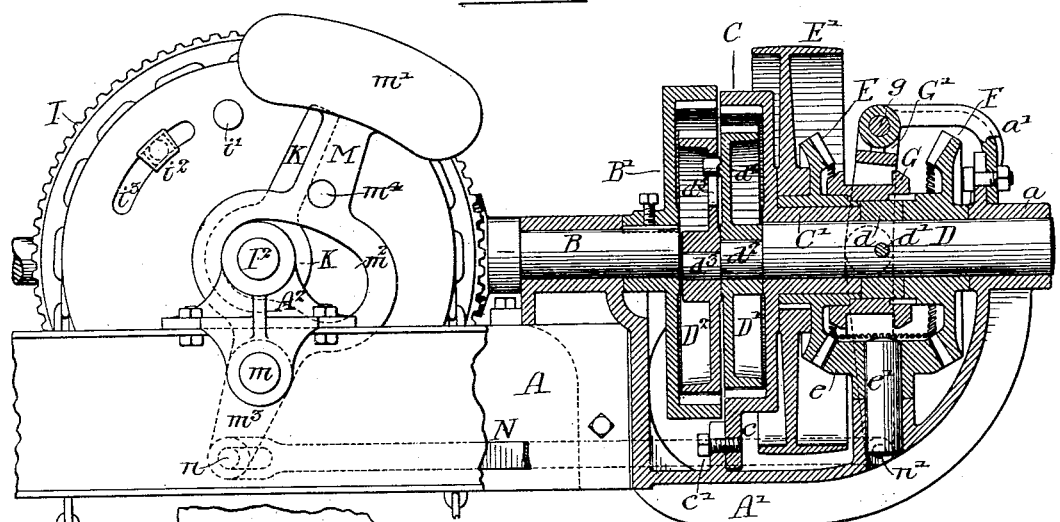
Figures 2, 3, 4:
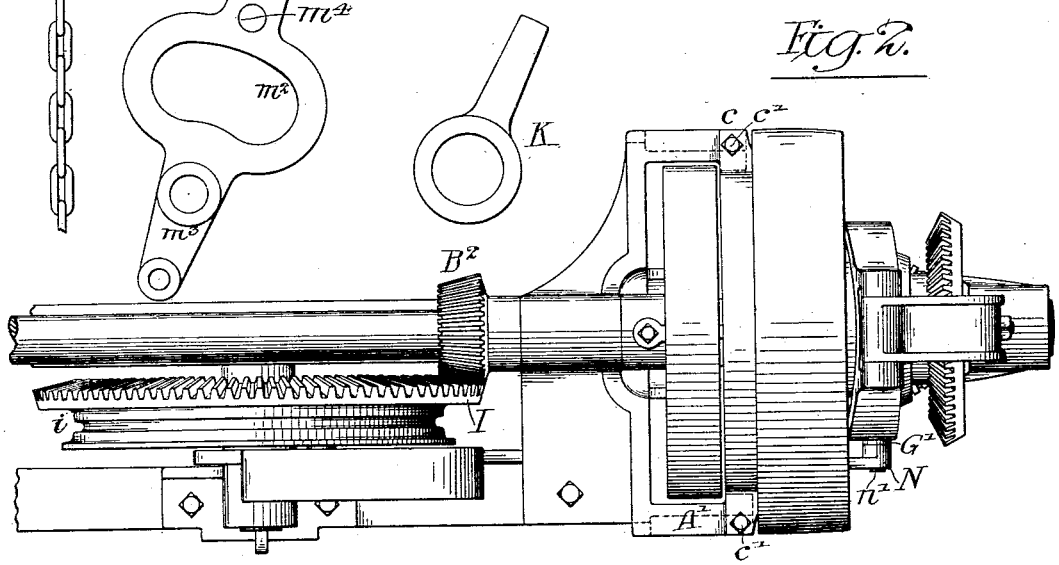
Figure 5:
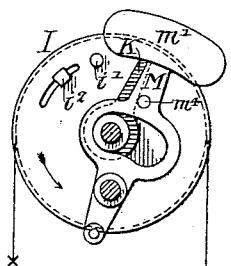

In the accompanying drawings, Figure 1 is a side view, partly in section, illustrating my improved mechanical movement. Fig. 2 is a plan view. Figs. 3 and 4 are views of details of the invention, and Figs. 5, 6, 7, and 8 are diagram views.

A is a frame having bearings for a driven shaft B. Secured to this shaft is an internal gear-wheel B', in the present instance having fifty-one teeth.

C is a second internal gear-wheel facing the wheel B'. This wheel has fifty teeth in the present instance. The wheel C is secured to a bracket A' on the frame A. Ears or lugs on the wheel are secured to projections on the bracket by screw-bolts $c'$.

The wheel C has a hub C', forming one bearing for a clutch-shaft D. The other bearing $a$ for this clutch-shaft is carried by the bracket A'.

Arranged to travel loose on the hub C' of the fixed internal gear-wheel C is a bevel gear-wheel E, secured to the hub of which is a driving-wheel E', which in the present instance is a belt-pulley.

The bevel gear-wheel E meshes with an intermediate wheel $e$, loose on a stud $e'$, carried by the bracket A'. This intermediate gear-wheel $e$ meshes with a bevel gear-wheel F, preferably of the same diameter as the wheel E. This wheel F is loosely mounted on the clutch-shaft D. A collar $d$ is secured to the shaft D by a pin $d'$ between the hub of the bevel gear-wheel F and the hub of the fixed wheel C', and sliding on this collar between the two bevel gear-wheels E and F is a clutch-sleeve G, grooved to receive the projections of a clutch-lever G' (shown by dotted lines in Fig. 1) and hung at $g$ from a bracket $a'$, secured to the bearing $a$.

On the hubs of the wheels E and F are clutch-teeth, with which engage the teeth on each end of the sleeve G, so that when the clutch is in the position shown in Fig. 1 the shaft D will be connected directly with the belt-wheel E' and turn with it; but if the clutch is thrown over so as to engage the bevel gear-wheel F, then the shaft D is driven from the belt-wheel E' through the gears E, $e$, and F, and therefore the shaft will turn in the opposite direction to the belt-wheel E'. In the present instance the speed of the shaft is the same whether it is turning in one direction or the other; but it will be understood that the speeds of the shafts may be varied without departing from the main feature of the invention.

It is necessary in operating the scrapers of a fuel-economizer to move the scrapers very slowly, and in order to drive the scrapers from a rapidly-revolving wheel I use the planetary gearing shown.

On the end of the clutch-shaft D is an eccentric extension $d^2$, on which is mounted a gear-wheel D', which meshes with the internal gear-wheel C; but this gear-wheel is less in diameter than the said wheel and so proportioned that it will travel around the gear-wheel C as a fixed rack. Extending from the eccentric portion $d^2$ of the shaft D is another eccentric portion $d^3$, less in diameter in the present instance than the portion $d^2$, and loose on this extension is a gear-wheel $D^2$, which meshes with the teeth on the internal gear-wheel B', secured to the shaft B. The internal gear-wheel D' in the present instance has a pin $d^4$, which enters a slot $d^5$ in the gear-wheel $D^2$, so that the two wheels will move together, but will have sufficient play that each will mesh with its particular internal gear-wheel. Thus during one revolution of the clutch-shaft D the shaft B will turn the distance of one tooth of its internal gear-wheel B'. By changing the number of teeth of the internal gear-wheels B' and C' the speed of the shaft B can be varied. On the shaft B' in the present instance is a bevel-pinion $B^2$, which meshes with a bevel gear-wheel I, having a chain-drum $i$ formed thereon, around which passes a chain J, carrying at each end a set of scrapers which travel in contact with the tubes of the fuel-economizer.

The shaft B can be continued throughout the length of the economizer and plain chain-drums geared thereto, according to the number of tubes used in the economizer.

The bevel gear-wheel I is mounted on a stud $I^2$, carried by a bearing $A^2$ on the frame A, and on the hub of this wheel in the present instance is a loose arm K, Fig. 4.

Pivoted to a stud $m$ on the bracket $A^2$ in the present instance is a lever M, carrying a weight $m'$ at its upper end, and this lever is slotted at $m^2$ to allow for the passage of the stud $I^2$ and a portion of the bearing $A^2$, the bearing acting as a stop to limit the movement of the lever in either direction. Extending beyond the pivot $m$ of the lever is an arm $m^3$, which is attached to a shifter-rod N by a pin $n$ entering a slot in this rod. The other end of the rod is connected at $n'$ to the clutch-lever G'.

By providing a construction such that there is lost motion in the connection between the lever M and the rod N the first movement of the lever M is not transmitted to the clutch, and not until the lever passes over the center is the clutch thrown. Thus the weight $m'$ materially aids the mechanism in shifting the clutch. On the lever M is a pin or lug $m'$, projecting in the path of the loose lever K, and on the wheel I are two lugs $i'$ $i^2$, also in the path of the arm K. In the present instance the lug $i'$ is fixed, while the lug $i^2$ is arranged to be moved toward and from the lug $i'$. The lug $i^2$ rests in a slot $i^3$ in the wheel I and is held in place therein by a clamp-screw.

The operation of the mechanism is as follows: It is desired to reciprocate the scrapers very slowly up and down the tubes, so as to remove the soot collected thereon. When one scraper is at the highest point of the tube, the other scraper attached to the other end of the chain is at the lowest point, and when this point is reached the mechanism is automatically shifted so as to reverse the direction of rotation of the wheel I, and consequently the direction of movement of the scrapers. The shifting mechanism, consisting of the wheel I with its lugs, the loose arm K, and the lever M, may be mounted on a shaft independently from the chain-drum, and if a series of chain-drums are used only one may be provided with the shifting mechanism. The belt-wheel E' travels in one direction only, and the shaft D, on which the clutch-sleeve is mounted, can be thrown either into gear with this wheel direct or indirectly with it through the gears $e$ and $f$, so as to reverse its movement. Motion is imparted, therefore, to the shaft D first in one direction and then in the opposite direction. In order to reduce the speed of the shaft B, the planetary gearing, consisting of the two internal wheels B' and C and the two gear-wheels D' and $D^2$, is mounted between the clutch-shaft D and the driven shaft B. The length of travel of the scrapers on the tubes is equal to very nearly two complete revolutions of the gear-wheel I, and in order to shift the clutch at the proper point the mechanism is so timed as to reverse the movement after nearly two complete revolutions of the shaft.

Figure 6:
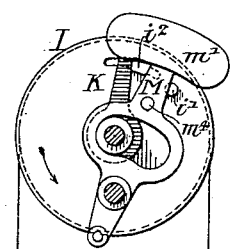
Figure 7:
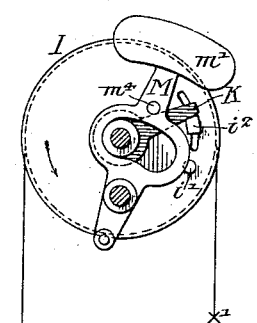
Figure 8:
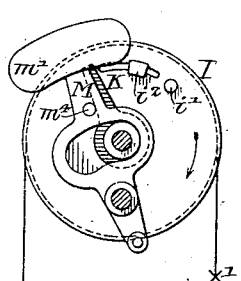

Referring now to Figs. 5, 6, 7, and 8, a scraper $x$ is on the first part of its downward stroke and the scraper $x'$ is on the first part of its upward stroke, and the wheel I is traveling in the direction of the arrow. This wheel will travel very nearly one full revolution before the lug $i^2$ strikes the loose arm K. When it strikes this arm, as shown in Fig. 6, it moves it away from the lever M, which remains stationary. The two scrapers are then in the mid-position. As the wheel travels it carries with it the loose arm K until the said arm is brought in contact with the pin or lug $m^4$ on the lever M, as shown in Fig. 7. Then the scraper $x$ is nearing the end of its downward stroke and the scraper $x'$ is nearing the end of its upward stroke. The arm K being backed by the positively-moving lug $i^2$ on the wheel I will force the lever M forward and cause it to pass over the vertical line and drop to the position shown in Fig. 8. This movement will cause the lever to move the clutch-lever over and shift the clutch from engagement with the wheel E to engagement with the wheel F, thus reversing the movement of the clutch-shaft D, and consequently the movement of the shaft B and the wheel I, so that the direction of movement of the scrapers will be reversed, as indicated by the arrows, Fig. 8.

Thus it will be seen by the above-described mechanism that a slow reciprocating motion is imparted to the scrapers from a wheel or shaft revolving in one direction.

I claim as my invention—

1. In a mechanical movement, the combination of a frame, a driven shaft, means for rotating the same in a definite direction, means for reversing the direction of rotation of said shaft, said means including a wheel driven by the shaft, a weighted lever pivoted to the frame, a link directly engaging one arm of the lever and operatively attached to another portion of the reversing means, a loose arm, a lug on the wheel arranged to engage the arm and move it during a portion of the rotation of said wheel, said arm engaging the weighted lever so as to shift it and thereby cause a reversal of the direction of rotation of the driven shaft, substantially as described.

2. In a mechanical movement, the combination of means for transforming continuous rotary motion into alternative rotary motion, comprising a driven shaft, means for rotating the same in a definite direction, a wheel operated by the driven shaft, and a supporting-shaft for said wheel, with mechanism for reversing the motion of said driven shaft, the same including a weighted lever, an arm loosely supported by the wheel-supporting shaft and arranged to engage the lever, a lug on the wheel placed to engage the arm and move it nearly a full revolution, said arm being constructed to engage the weighted lever and operate it to reverse the driven mechanism, substantially as described.

3. In a mechanical movement, the combination of a driver rotating in one direction, a driven wheel operated from the driver and rotating in the opposite direction, a clutch member between the driver and the driven wheel, a shaft driven from the clutch member, a wheel driven by said shaft, a weighted arm connected to the clutch member, a loose arm, lugs on the wheel engaging the loose arm, the said loose arm being constructed to engage the weighted lever, said wheel being free to complete nearly two revolutions between each operation of the clutch, substantially as described.

4. In a mechanical movement, the combination of a driving-wheel rotating in one direction, a wheel driven from the driver and rotating in the opposite direction, a clutch arranged to engage either of said wheels, a clutch-shaft, a driven shaft, planetary gears between the clutch-shaft and the driven shaft so that the driven shaft will be revolved slowly, a wheel driven by the driven shaft, a weighted arm connected to the clutch-sleeve, stops to limit the motion of said arm, a loose arm, a lug on the wheel engaging the loose arm and the loose arm engaging the weighted lever after the wheel has completed nearly two turns, so as to reverse the rotation of the wheel and the driven shaft, substantially as described.

In testimony whereof I have signed my name to this specification in the presence of two subscribing witnesses.

GEORGE H. BURPEE.

Witnesses:
 WILL. A. BARR,
 JOS. H. KLEIN.